United States Patent [19]
Bettini

[11] Patent Number: 6,027,173
[45] Date of Patent: Feb. 22, 2000

[54] LEVELING SYSTEM FOR MOTOR VEHICLES

[76] Inventor: Marco Bettini, Via della Pace, 7 Fr. San Marino - 40010, Bentivoglio (Bologna), Italy

[21] Appl. No.: 08/955,954

[22] Filed: Oct. 28, 1997

[51] Int. Cl.⁷ ........................................................ B60P 1/16
[52] U.S. Cl. ........................................ 298/17 S; 280/6.154
[58] Field of Search .................................. 298/17 S, 17.5; 280/6.154; 180/41

[56] References Cited

U.S. PATENT DOCUMENTS

| | | |
|---|---|---|
| 3,695,710 | 10/1972 | Cresci et al. . |
| 3,995,894 | 12/1976 | Bishop . |
| 4,036,528 | 7/1977 | Langendorf ........................... 298/17 S |
| 4,261,616 | 4/1981 | Beegle .................................. 298/17 S |
| 5,769,502 | 6/1998 | Bettini .................................. 298/17 S |

FOREIGN PATENT DOCUMENTS

| | | |
|---|---|---|
| 401601 | 2/1934 | Belgium . |
| 048534 | 3/1982 | European Pat. Off. . |
| 732236 | 9/1996 | European Pat. Off. . |
| 2076202 | 1/1970 | France . |
| 2259720 | 2/1974 | France . |
| 42 27 886 | 2/1994 | Germany . |
| BO95A0106 | 3/1995 | Italy . |
| 605202 | 12/1977 | Switzerland . |
| 2202497A | 9/1998 | United Kingdom ................. 298/17 S |

*Primary Examiner*—Stephen T. Gordon
*Attorney, Agent, or Firm*—Fay, Sharpe, Fagan, Minnich, & McKee

[57] ABSTRACT

A leveling system for vehicles including a frame connected to wheels, and a dump body. The dump body is pivotally connected to the frame about a first axis placed at the rear end of the vehicle, and a mechanism for moving the dump body in relation to the frame is provided to enable the dump body to rotate around the first axis for purposes of unloading material inside the dump body. The leveling system includes an inclination detector for detecting the inclination of the first axis relative to horizontal. An adjustment system is provided for adjusting the inclination of the dump body to the horizontal. The adjustment system, itself, includes at least one bracket positioned between the frame and the dump body, wherein the bracket is centrally pivoted on a substantially horizontal pin perpendicular to the first axis. The pin defines a second axis and joins the frame to the dump body. At least two variable extension elements are placed opposite each other on either side of the second axis for connecting the bracket to the frame and adjusting the inclination of the dump body relative to the frame based upon the inclination detected by the first axis inclination detector. The leveling system further includes at least one sensor positioned on part of the motor vehicle for detecting the working position of the vehicle. The adjustment mechanism is activated to adjust the inclination of the first axis relative to horizontal according to the sensed working position of the vehicle.

13 Claims, 3 Drawing Sheets

LEVELING SYSTEM FOR MOTOR VEHICLES

BACKGROUND OF THE INVENTION

The present invention relates to an improved leveling system for motor vehicles particularly used by industrial vehicles with a dump body. Vehicles equipped with dump bodies have a frame connected to the wheels by suspension and supported by an auxiliary frame which is hinged to the dump body pivoted by a shaft positioned at the rear end of the vehicle.

To dump loose material such as soil, sand etc., the dump body is raised until it reaches an angle in relation to the frame which will enable the dump body to be emptied.

This operation can be carried out when the vehicle is stationary but in most cases the vehicle is simultaneously driven forward to facilitate the tipping out of the load.

When the vehicle, which may be a truck, a semi-trailer or a trailer is on safe, solid ground, for example a flat, tarred surface, dumping operations are usually carried out safely and without problems. When the ground the vehicle is standing on is not level, on the other hand, raising the body to dump the material being carried is difficult and may be very dangerous.

In fact, if the wheels of the vehicle, particularly the back wheels, do not have a sufficiently solid support, the vehicle tilts (and rolls about its longitudinal axis) placing more weight on one side of it than on the other.

Such situations are relatively frequent and make it difficult to manage the beginning of dumping operations. The stability of the ground on which the vehicle has to work is not always easy to judge since the vehicles concerned are used on building sites and landfills, where the surface is covered by a layer of loose material compacted to varying degrees.

For this reason, even if the wheels on the rear axle (or axles) may be perfectly level when the vehicle starts dumping, the increased weight bearing on the rear axle may cause the vehicle to gradually tilt to one side as the dumping operation proceeds. Although the tilt angle may be just a few degrees at the base, it is much greater at the top when the dump body is raised and leads to irregular dumping. If the load to be dumped is wet soil or similar material, the dumping operation is even more critical; such materials, once the vehicle is tilted sideways, tend to come loose mainly on the side opposite the tilted side, thus making the load on the vehicle even more imbalanced by increasing the mass weighing down on one side of the axle.

As a result, the vehicle becomes much more unstable during dumping operations, creating an obvious hazard for the operator (driver) and the risk of damaging the vehicle itself.

Moreover, should the vehicle roll over completely, not only is the driver's life at risk but also the lives of any persons who may be working near the vehicle. Since the dump command is normally given from inside the cab, the drivers of the vehicles often have to work under very awkward conditions. In practice, a driver must dump the load, if necessary by inching the vehicle forward and stopping it alternately, without being able to check the real state of the load or to fully control the dumping operation and while being constantly on guard against the risk of rolling over.

At present, the stability of a vehicle during dumping operations, is guaranteed by the strength of the connection between the frame and auxiliary frame, which subjects the vehicle structure to considerable torsional strain.

For this reason, the frame and the auxiliary frame must be appropriately constructed but even a strong structure may be insufficient to prevent rolling over or damage in the event of abrupt yielding or subsidence of the ground under the vehicle wheels.

A solution to these problems has been provided by the same Applicant with the invention disclosed in the patent application IT-BO95A 000106. The previous patent application relates to a leveling system which enables the hinged shaft between the dump body and the auxiliary frame to remain horizontal, thus enabling the material in the truck to be dumped safely and easily.

The leveling system disclosed in the above mentioned application basically includes means for detecting the inclination of the hinged shaft between the dump body and the auxiliary frame to the horizontal and means for adjusting the inclination consisting of a pivoted lever or bracket which is acted on by at least two variable extension elements located on opposite sides of the pivot and designed to adjust the inclination in accordance with the readings of the detecting means.

SUMMARY OF THE INVENTION

The invention disclosed in the present patent application is an improvement on the above mentioned leveling system and enables the leveling system to be handled better, due to an improved system for controlling some parts of the motor vehicle and the leveling system.

BRIEF DESCRIPTION OF THE DRAWING

Further characteristics and advantages of the invention are apparent from the detailed description which follows, with reference to the accompanying drawings, which illustrate preferred embodiments of the invention by way of example and in which.

Figure 1:
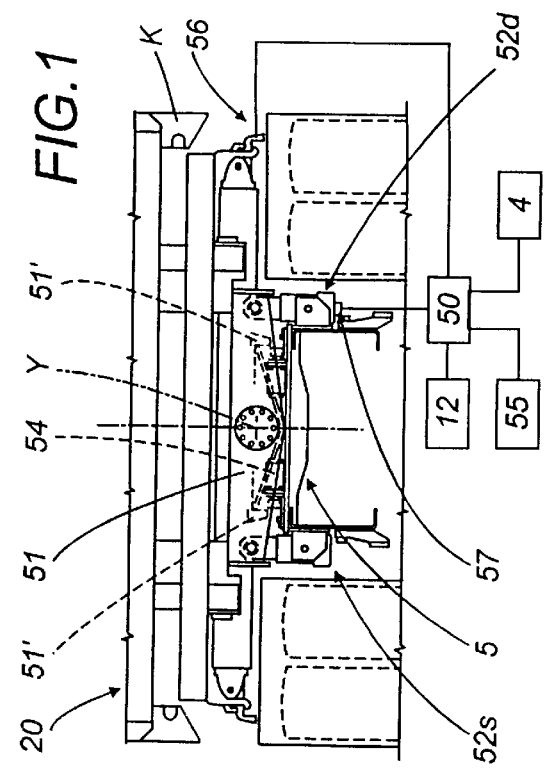
FIG. 1 is a partial rear view of a motor vehicle equipped with the system disclosed, with some components represented schematically as blocks.
Figure 6:
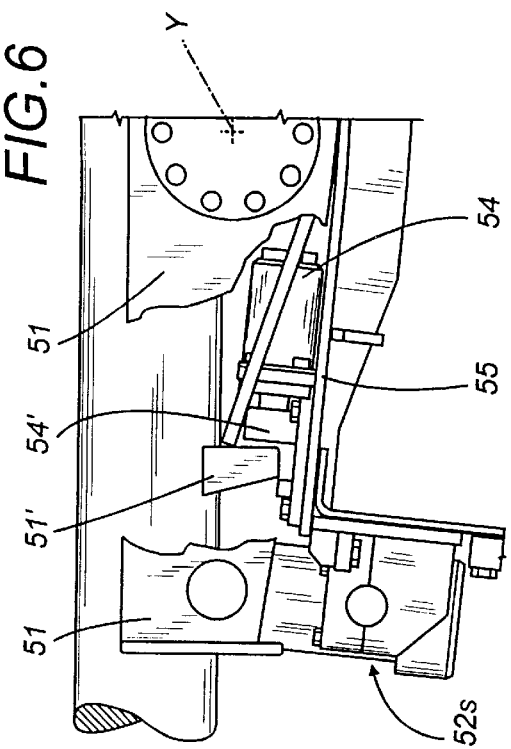
FIGS. 4, 5, and 6 are partial rear views of a motor vehicle according to the present invention in different stages of use.
Figure 4:
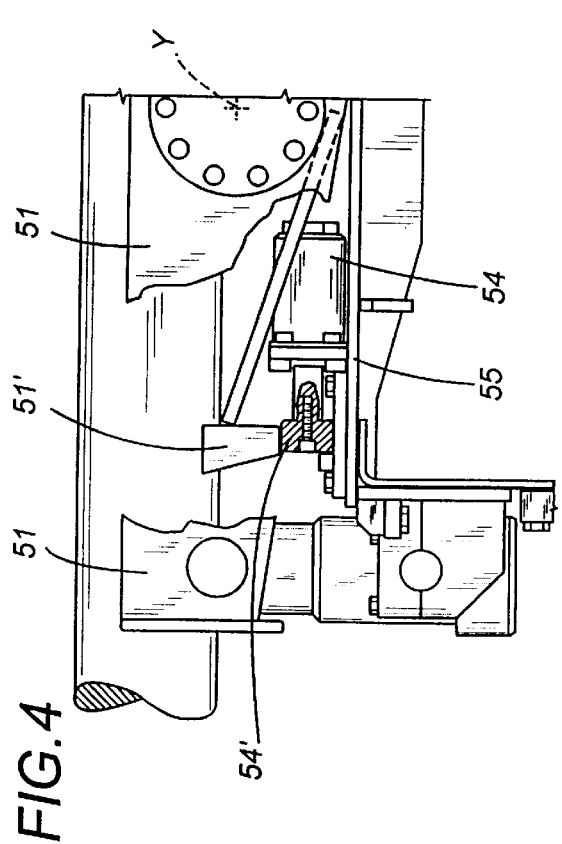
Figure 5:
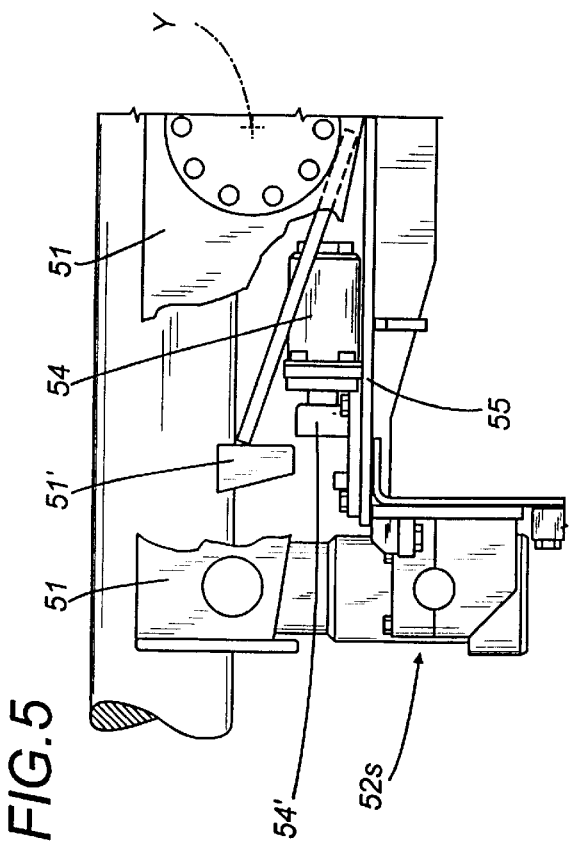
Figure 2:
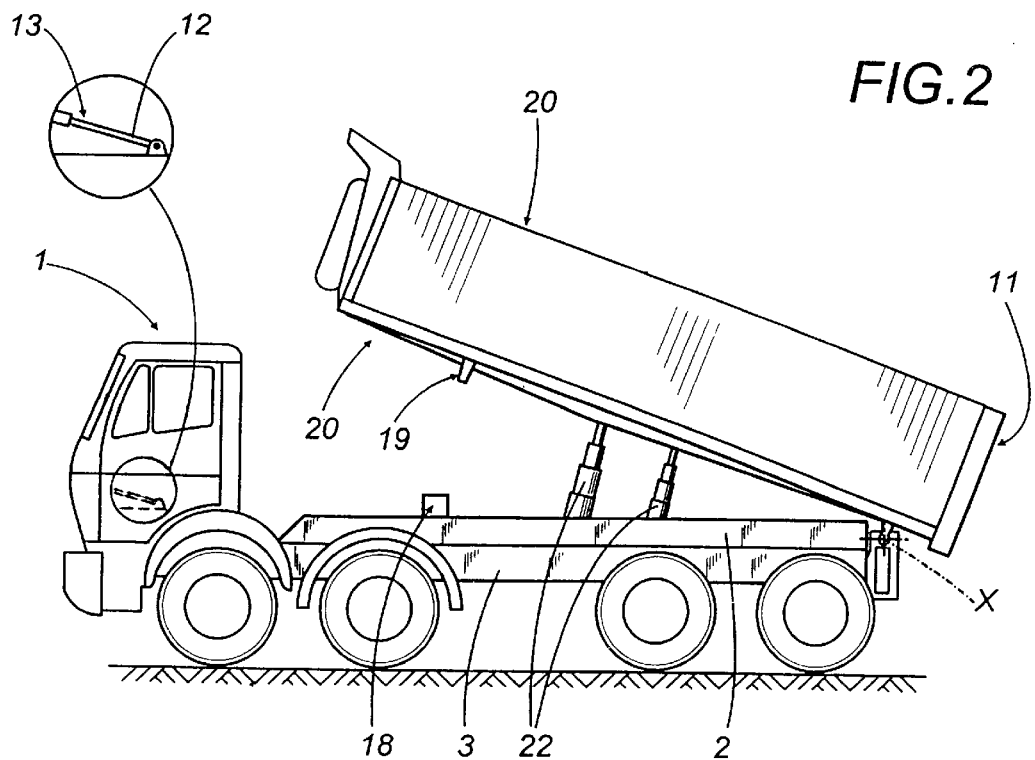
FIG. 2 is a side view with some details enlarged and represented schematically, of a motor vehicle according to the present invention while in operation.

With reference to the drawings listed above, in accordance with the present invention, the leveling system for motor vehicles is used in particular for vehicles with dump bodies.

DESCRIPTION OF THE PREFERRED EMBODIMENTS

In the embodiments illustrated the invention is applied to a truck 1, with a supporting frame 3, and an auxiliary frame 2 that hinges to a dump body 20 by a shaft X placed at one end 11 of the vehicle 1. In the following description, for the sake of simplicity, reference will made to a frame 2,3 meaning both the frame 3 and auxiliary frame 2. In other words, the vehicle has a loading structure, which, in the embodiments illustrated, is defined by the body 20 and a supporting structure (defined by the frame 3 and the auxiliary frame 2) hinged together to permit tipping.

To enable the dump body 20 to rotate on the hinge shaft X so as to dump the load, the system envisages lifting means defined, in the embodiment illustrated, by a pair of hydraulic cylinders 22.

The leveling system includes means 4 for detecting the inclination of the first hinge shaft X to the horizontal and means 5 for adjusting the inclination.

The means for detecting the inclination are represented schematically in FIG. 1 by a block 4. They may be an instrument consisting of an inclinometer or similar device, designed to provide an output signal, preferably electrical, in accordance with the detected inclination to the horizontal.

The means for adjusting the inclination 5 include at least one lever or bracket 51 placed between the frame 2,3 and the dump body 20, and centrally pivoted on a substantially horizontal pin perpendicular to the first shaft X so as to define a second shaft Y joining the frame 2,3 to the dump body 20.

In the embodiment illustrated, between the bracket 51 and the frame 2,3 there are two variable extension elements 52s and 52d.

The variable extension elements 52 are placed opposite each other on both sides of the pin Y and are designed to modify the inclination of the bracket 51 to the frame 2,3 according to the readings taken by the inclination detecting means 4.

The variable extension elements consist of a pair of hydraulic actuators 52s and 52d (for example hydraulic cylinders) controlled by a hydraulic circuit.

The control circuit of the variable extension elements 52 is not shown in its entirety but is represented by a block 50 in FIG. 1.

The bracket 51 may envisage means for stopping its rotation about the pin Y, in such a way as to stop the corresponding rotation of the dump body 20 around the frame 2,3.

The stopping means may be constituted by the variable extension elements 52 themselves, in which case they must be of the type capable of self locking under defined conditions when not operating. Alternatively, they may be constituted by at least one actuator 54 connected to a hydraulic circuit and having at least one end 54' that may be inserted into a corresponding seat made in the bracket 51, or by a vertical plate 51' integral with it.

The disclosed leveling system has means 50 for activating the means 5 for adjusting the inclination including or connected to a sensor positioned on the controls of the motor vehicle 1 and/or positioned on parts of the motor vehicle 1 itself, in such a way as to enable the activation of the means 5 for adjusting the inclination when the vehicle 1 is in a certain working position, as explained more clearly below.

The activating means 50 may be a leveling circuit designed to trigger the means of activation when a certain threshold value is reached detected by the angle detecting means 4. In other words the leveling circuit (not shown in the embodiments because it may be included in the detecting means 4) activates the leveling of the vehicle only when the inclination of the vehicle itself is greater than a certain value in relation to the horizontal Z. This means that they are never activated by the vehicle suspension.

Among the vehicle controls, there may be at least one control 12 for a parking brake 13 of the motor vehicle 1.

In other words the system includes the use of the hand brake to start the leveling operation.

As stated above, the bracket includes means of stopping its rotation around the shaft Y, so that the corresponding rotation of the dump body in relation to the frame 2,3 is stopped, this means consists of an actuator 54 (or a pair of actuators 54). The system may include sensor means 55 placed, for example at the extreme end 54' and connected to the activating means 50, so that the leveling means are activated when the bracket 51 is not stopped.

When the dump body of the vehicle tilts sideways, or when the dump body 20 rotates on a shaft K positioned longitudinally along the motor vehicle 1, the system may include sensors 56 to detect the rotation on the shaft K, so that a corresponding signal is sent to the activating means 50 so that the activation of the leveling means 5 are disabled in relation to the sideways tilting of the dump body 20.

In addition at least one of the variable extension elements 52d has a sensor 57 to measure the value of the distance between the frame 2,3 and the dump body 20, that is to discover the amount by which the dump body 20 has moved in relation to the frame 2,3 so that the correct maneuver can be made to return the dump body to the rest position, that is substantially parallel to the frame 2,3 independently of the inclination of the motor vehicle in relation to the horizontal Z. This means that the lower pins 19 of the dump body 20 can be correctly inserted into their corresponding seats 18 on the frame 2,3.

Figure 7:
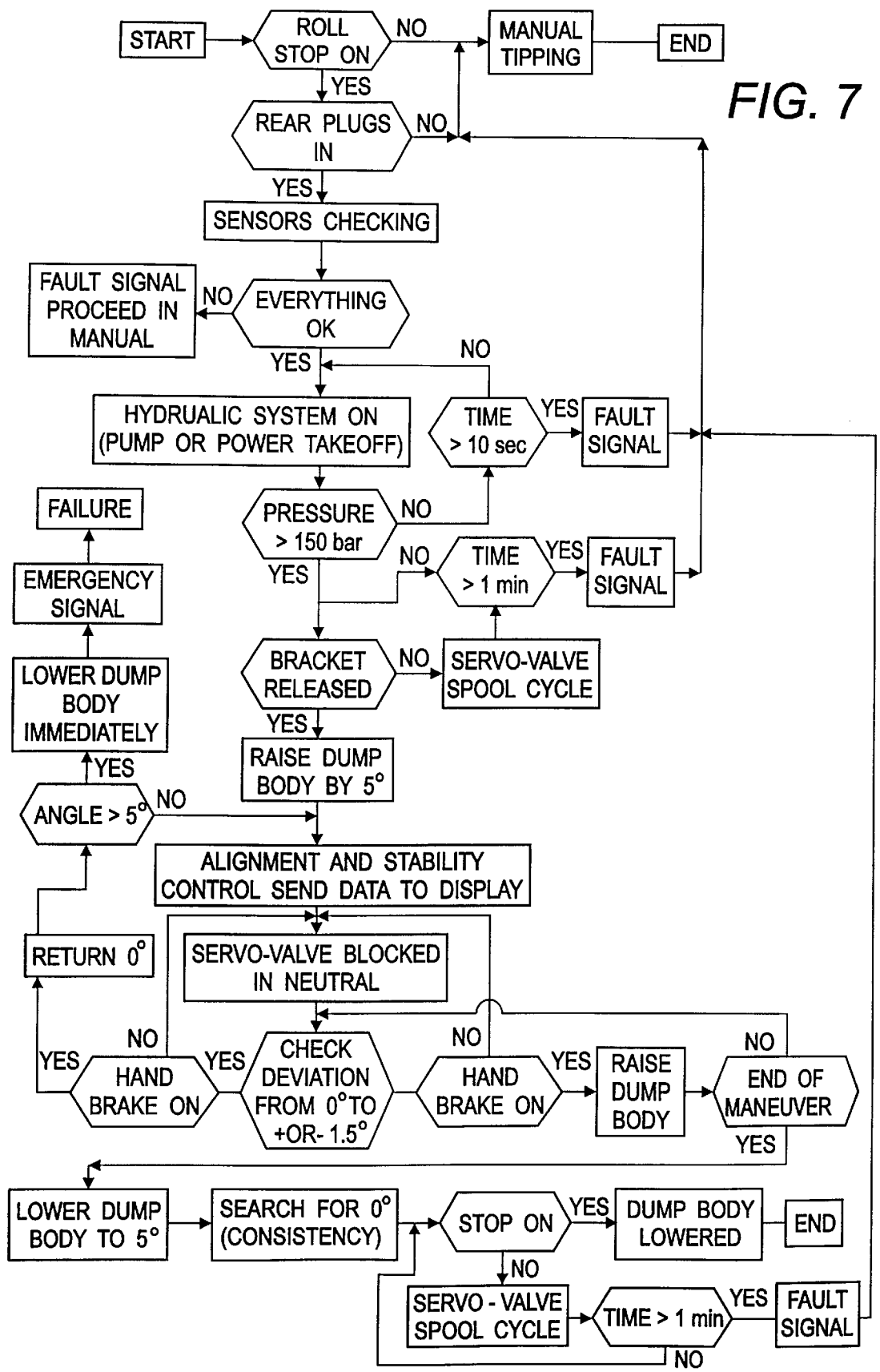
FIG. 7 is a flow diagram showing how the present invention functions.

A possible example of the way the leveling system disclosed functions is described in the flow diagram in FIG. 7.

In practice the leveling system includes a series of enabling devices in order to balance the vehicle. One of these comes from the hydraulic circuit pressure level being sufficient. Other enabling devices come from; putting on the hand brake 13, stopping the bracket 51, and tilting the dump body sideways (when required).

Figure 3:
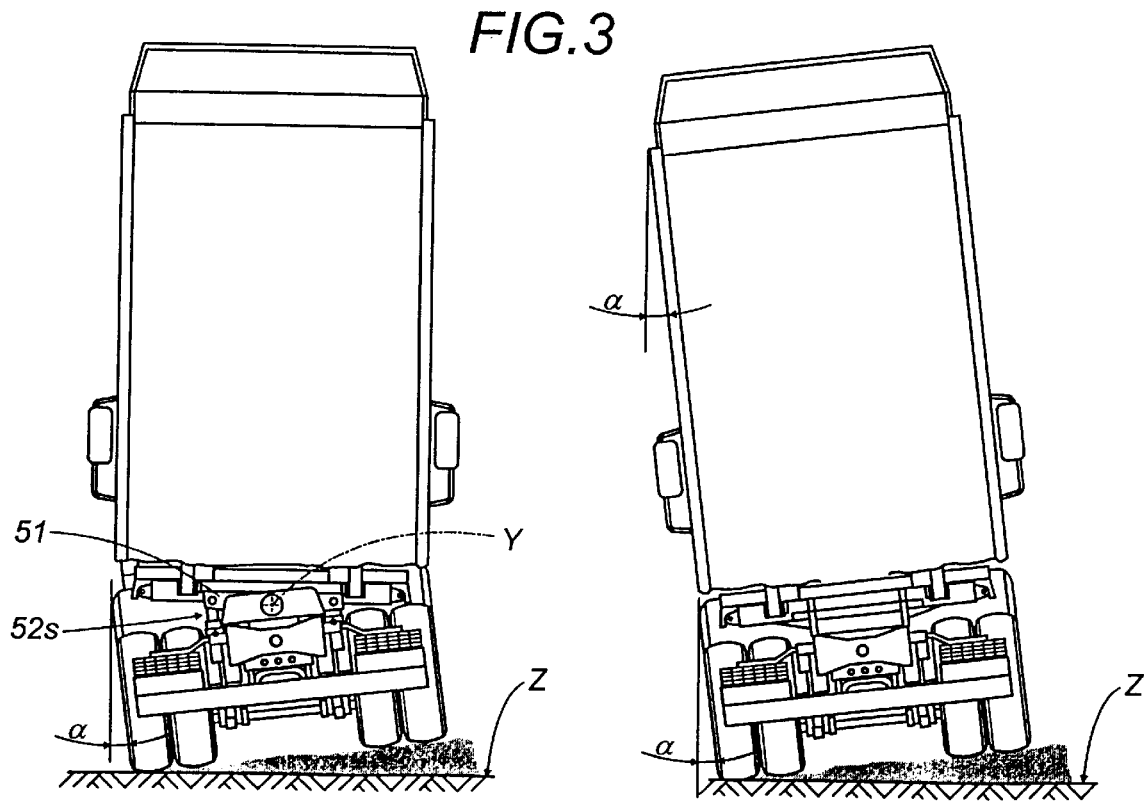
FIG. 3 is a full rear view of two motor vehicles with dump bodies showing two possible situations which could occur while operating. The motor vehicle on the left is equipped with the disclosed leveling system and the one on the right is of a conventional type, without a leveling system.

FIG. 3 shows the difference in stability derived from the present invention. The angle a in relation to the horizontal on a conventional vehicle (the vehicle shown on the right) causes the whole vehicle to tilt, while on a vehicle with a leveling system it does not tilt so that the dump body 20 stays horizontal.

The invention described can be subject to modifications and variations without thereby departing from the scope of the inventive concept. Moreover, all the details of the invention may be substituted by technically equivalent elements.

What is claimed:

1. A leveling system for motor vehicles comprising:

a frame connected to wheels of the vehicle;

a dump body for carrying material, the dump body being pivotally connected to the frame about a first axis placed at the rear end of the vehicle;

means for moving the dump body in relation to the frame, enabling the dump body to rotate around the first axis, whereby material inside the dump body is unloaded therefrom;

means for detecting inclination of the first axis relative to horizontal;

means for adjusting inclination of the dump body relative to horizontal, said inclination adjusting means including:

at least one bracket positioned between the frame and the dump body, the bracket being pivoted on a substantially horizontal pin perpendicular to the first axis, the pin defining a second axis and joining the frame to the dump body;

at least two variable extension elements placed on opposite sides of the second axis, the variable extension elements connecting the bracket to the frame and adapted for adjusting inclination of the dump body relative to the frame, according to the inclination detected by the detecting means;

the leveling system further comprising:

sensor means positioned on parts of the motor vehicle and detecting a working position of the vehicle; and means for activating the inclination adjusting means according to the working position of the vehicle detected by the sensor means.

2. The leveling system according to claim 1, wherein:

said leveling system is adapted for triggering the means for activating the inclination adjusting means according to a threshold value detected by the detecting means.

3. The leveling system according to claim 2 wherein said sensor means comprises at least one sensor positioned on a control for a parking brake to sense operation of said parking brake.

4. The leveling system according to claim 3 further comprising:

means for stopping rotation of the bracket about the second axis, in order to stop corresponding rotation of the dump body about the frame, said stopping means including at least one actuator having at least one end adapted for insertion in one of: (i) a corresponding seat of the bracket; and, (ii) a rigid part connected to the bracket itself; and at least one sensor positioned on the end of the actuator and connected to the means for activating the inclination adjusting means, the sensor positioned on the end of the actuator detecting rotation of the bracket so that the inclination adjusting means can be activated when the bracket is not stopped.

5. The leveling system according to claim 4 wherein at least one of the variable extension elements comprises a sensor designed to measure a distance between the frame and the dump body in order to maneuver the dump body to a rest position substantially parallel to the frame based upon said distance between the frame and the dump body, independently of any inclination of the vehicle relative to horizontal.

6. A leveling system for motor vehicles comprising:

a frame;

wheels connected to the frame;

a dump body for carrying material pivotally connected to the frame about a first axis placed at the rear end of the vehicle;

means for moving the dump body in relation to the frame, enabling the dump body to rotate around the first axis whereby material inside the dump body is unloaded;

means for detecting inclination of the first axis to the horizontal;

means for adjusting inclination of the dump body to the horizontal, said inclination adjusting means including:

at least one bracket positioned between the frame and the dump body, the bracket being pivoted on a substantially horizontal pin perpendicular to the first axis, the pin defining a second axis and joining the frame to the dump body;

at least two variable extension elements placed on opposite sides of the second axis, the variable extension elements connecting the bracket to the frame and adjusting inclination of the dump body relative to the frame according to inclination detected by the detecting means;

the leveling system further comprising:

sensor means positioned on parts of the motor vehicle and detecting the working position of the vehicle, the sensor means comprising at least one sensor positioned on a control for a parking brake; and, means for activating the inclination adjusting means according to the working position of the vehicle detected by the sensor means.

7. The leveling system according to claim 6, further comprising:

means for stopping rotation of the bracket about the second axis, in order to stop corresponding rotation of the dump body about the frame, said stopping means including at least one actuator having at least one end that can be inserted in a corresponding seat of the bracket or a rigid part connected to the bracket itself; and, at least one sensor positioned on the end of the actuator and connected to the means for activating the inclination adjusting means, the at least one sensor of the actuator detecting rotation of the bracket so that the inclination adjusting means is activated when the bracket is not stopped.

8. The leveling system according to claim 7, wherein at least one of the variable extension elements has a sensor designed to measure the distance between the frame and the dump body, in order to maneuver the dump body to the rest position substantially parallel to the frame.

9. A leveling system for motor vehicles comprising:

a vehicle frame;

vehicle wheels connected to the vehicle frame;

a dump body for carrying material, the dump body pivotally connected to the frame about a first axis placed at the rear end of the vehicle;

means for moving the dump body in relation to the frame and enabling the dump body to rotate around the first axis whereby material in the dump body is unloaded;

detecting means for detecting inclination of the first axis relative to horizontal;

adjustment means for adjusting inclination of the dump body relative to horizontal including:

at least one bracket positioned between the frame and the dump body, the bracket centrally pivoted on a substantially horizontal pin perpendicular to the first axis, the pin defining a second axis and joining the frame to the dump body;

at least two variable extension elements placed opposite each other on either side of the second axis, the variable extension elements connecting the bracket to the frame and adjusting the inclination of the dump body relative to the frame according to the inclination detected by the detecting means;

the leveling system further comprising:

means for stopping rotation of the bracket about the second axis in order to stop corresponding rotation of the dump body about the frame, said stopping means including at least one actuator with at least one end adapted for insertion in a corresponding seat of the bracket or of a rigid part connected to the bracket itself;

sensor means positioned on the end of the actuator and detecting rotation of the bracket;

activation means for activating the adjustment means according to bracket rotation detected by the sensor means so that the adjustment means can be activated when the bracket is not stopped.

10. The leveling system according to claim 9, wherein at least one of the variable extension elements has a sensor designed to measure a distance between the frame and the dump body, said distance used by said activation means to maneuver the dump body to a rest position substantially parallel to the frame.

11. A leveling system for motor vehicles comprising:

a frame connected to wheels of the motor vehicle;

a dump body for carrying material, the dump body being pivotally connected to the frame about a first axis placed at the rear end of the vehicle and about a second axis positioned longitudinally along the motor vehicle;

means for moving the dump body in relation to the frame, enabling the dump body to rotate selectively around the first or the second axis, whereby the material inside the dump body is unloaded;

means for detecting inclination of the first axis to the horizontal;

means for adjusting inclination of the dump body to the horizontal including:

at least one bracket positioned between the frame and the dump body, the bracket being pivoted on a substantially horizontal pin perpendicular to the first axis, the pin defining a third axis and joining the frame to the dump body;

at least two variable extension elements placed opposite each other on either side of the third axis, the variable extension elements connecting the bracket to the frame and adjusting inclination of the dump body to the frame according to the inclination detected by the detecting means;

the leveling system further comprising:

sensor means positioned on parts of the motor vehicle and detecting a working position of the vehicle; and, means for activating the dump body inclination adjustment means according to the working position of the vehicle detected by the sensor means.

12. The leveling system according to claim 11 comprising:

at least one sensor for detecting rotation of the dump body about the second, longitudinal axis and sending a corresponding signal to the activating means for the dump body inclination adjustment means so that the dump body inclination adjustment means are disabled when said dump body is rotated about the second, longitudinal axis.

13. A leveling system for motor vehicles comprising:

a frame connected to wheels of the vehicle;

a dump body for carrying material, the dump body being pivotally connected to the frame about a first axis placed at the rear end of the vehicle and about a second axis positioned longitudinally along the motor vehicle;

means for moving the dump body in relation to the frame, enabling the dump body to rotate selectively around the first or the second axis, whereby the material inside is unloaded;

means for detecting inclination of the first axis to the horizontal;

means for adjusting inclination of the dump body to the horizontal including:

at least one bracket positioned between the frame and the dump body, the bracket being centrally pivoted on a substantially horizontal pin perpendicular to the first axis, the pin defining a third axis and joining the frame to the dump body;

at least two variable extension elements placed opposite each other on either side of the third axis, the variable extension elements connecting the bracket to the frame and adjusting the inclination of the dump body to the frame based upon the inclination of the first axis as detected by the detecting means;

the leveling system further comprising:

sensor means for detecting the rotation of the dump body about the second, longitudinal axis and sending a corresponding signal; and, means for activating the dump body inclination means according to the signal sent by the sensor means as to rotation of the dump body about the longitudinal axis so that the adjusting means are disabled when the dump body is rotated about the longitudinal axis.

* * * * *